United States Patent [19]
Yoshikawa

[11] Patent Number: 5,117,369
[45] Date of Patent: May 26, 1992

[54] DTMF RECEIVER

[76] Inventor: Syuuichi Yoshikawa, 4-4-3, Torimi-cho, Nara-shi, Nara-ken, Japan

[21] Appl. No.: 431,776

[22] Filed: Nov. 6, 1989

[30] Foreign Application Priority Data

Nov. 8, 1988 [JP] Japan .................... 63-281635

[51] Int. Cl.$^5$ ........................... H04M 1/50
[52] U.S. Cl. ................... 364/484; 379/283; 340/825.74
[58] Field of Search ............ 364/484, 724.09; 379/283, 386, 282; 340/825.74, 825.73; 370/110.3; 375/80, 89

[56] References Cited

U.S. PATENT DOCUMENTS

| | | | |
|---|---|---|---|
| 3,845,249 | 10/1974 | Sellari, Jr. | 340/825.74 |
| 4,025,730 | 5/1977 | Sawai | 379/283 |
| 4,143,322 | 3/1979 | Shimamura | 375/81 |
| 4,347,408 | 8/1982 | Ito et al. | 379/283 |
| 4,604,755 | 8/1986 | Murray | 379/386 |
| 4,656,648 | 4/1987 | Vallet | 375/80 |

Primary Examiner—Thomas G. Black

[57] ABSTRACT

A DTMF receiver for a push-button telephone, a facsimile apparatus or the like is disclosed. The DTMF receiver comprises frequency shift delay detection units for lower and higher groups of frequencies. Each of said frequency shift delay detection units comprises: a circuit for generating a first signal and second signal having a frequency obtained by subtracting the reference carrier frequency from the frequency of the corresponding frequency group, the signal having a phase difference of $\pi/2$ with respect to said first signal; another circuit for generating a third signal and fourth signal which are different in phase from the first and second signals, respectively; a vector calculation circuit in which the first and second signals are supplied to one input port, and the third and fourth signals to the other input port; and a detection circuit for detecting a phase difference between the outputs of the vector calculation circuit.

4 Claims, 4 Drawing Sheets

DTMF RECEIVER

BACKGROUND OF THE INVENTION

1. Field of the Invention

The present invention relates to a DTMF (Dual Tone Multiple Frequency) receiver.

2. Description of the Prior Art

A DTMF signal is a signal used to transmit a telephone number, etc. from a push-button telephone or the like to a telephone exchange. Recently, a DTMF signal has also come to be used for transmission and reception of information after establishing a connection between telephones. Therefore, some facsimile machines and multifunctional telephones for connection to a public switched telephone network are equipped with a DTMF receiver.

In a DTMF signal, one of four lower frequency tones is combined with one of four higher frequency tones. The following four frequencies $f_A$ to $f_D$ are allocated to the tones of the lower frequency group.

$f_A = 697$ Hz
$f_B = 770$ Hz
$f_C = 852$ Hz
$f_D = 941$ Hz

The following four frequencies $f_E$ to $f_H$ are allocated to the tones of the higher frequency group.

$f_E = 1209$ Hz
$f_F = 1336$ Hz
$f_G = 1477$ Hz
$f_H = 1633$ Hz

For example, the DTMF signal representing the dial number "1" is composed of a combination of tone frequencies of 697 Hz and 1209 Hz.

FIG. 5 shows a conventional DTMF receiver. The DTMF receiver of FIG. 5 includes eight band-pass filters 110 to 117 which are connected to an input terminal 100. Each band-pass filter corresponds to one of the above-mentioned eight tone frequencies $f_A$ to $f_H$. In each band-pass filter, the center frequency of the pass band is set so as to be equal to the corresponding tone frequency. Connected to the band-pass filters are multipliers 120 to 127 by which the strengths of the output signals of the band-pass filters 110 to 117 are squared, respectively. The outputs of the multipliers 120 to 127 are supplied to level detectors 140 to 147 through smoothing low-pass filters 130 to 137, respectively. The output signals from the level detectors 140 to 147 are input to a coder 150.

The operation of the DTMF receiver of FIG. 5 will be described, taking as an example a case in which the DTMF signal representing the dial number "1" is supplied to the input terminal 100. The tone frequencies of 697 Hz and 1209 Hz which constitute the DTMF signal representing the dial number "1" pass through the band-pass filters 110 and 114, respectively. Therefore, the outputs of the level detectors 140 and 144 becomes HIGH, while the outputs of the other level detectors remain LOW. On the basis of the output signals of the level detectors 140 to 147, the coder 150 outputs a code indicating that the DTMF signal representing the dial number "1" has been entered.

As seen from the above description, a conventional DTMF receiver requires a large number of components including eight band-pass filters and eight smoothing low-pass filters. Also, since the tone frequencies are close to each other both in the low frequency group and in the high frequency group, the band-pass filters are required to have sharp and precise frequency-amplitude characteristics. Thus, a conventional DTMF receiver is very complex in construction.

SUMMARY OF THE INVENTION

The DTMF receiver of this invention, which overcomes the above-discussed and numerous other disadvantages and deficiencies of the prior art, comprises a frequency shift delay detection unit for one of a lower group of frequencies; and another frequency shift delay detection unit for one of a higher group of frequencies, and each of said frequency shift delay detection units comprises: a circuit means for generating a first signal and second signal, said first signal having a frequency obtained by subtracting the reference carrier frequency from the frequency of the corresponding frequency group, and said second signal having a phase difference of $\pi/2$ with respect to said first signal; another circuit means for generating a third signal and fourth signal, said third and fourth signals being different in phase from said first and second signals, respectively; a vector calculation means in which said first and second signals are supplied to one input port, and said third and fourth signals to the other input port; and a detection means for detecting a phase difference between the outputs of said vector calculation means.

In a preferred embodiment, the outputs of said vector calculation means are respectively the real part and imaginary part of a first complex number which is obtained by: designating the level of said first signal as the real part of a second complex number, and that of said second signal as the imaginary part of said second complex number; designating the level of said third signal as the real part of a third complex number, and that of said fourth signal as the imaginary part of said third complex number; and multiplying said second and third complex numbers.

In a preferred embodiment, the receiver further comprises a coder which is connected to the output of said detection means of each detection unit to generate a signal representing a digit.

Thus, the invention described herein makes possible the objectives of (1) providing a DTMF receiver which is simple in construction; (2) providing a DTMF receiver which requires a reduced number of components; and (3) providing a DTMF receiver which requires no band-pass filters having sharp frequency-amplitude characteristics.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
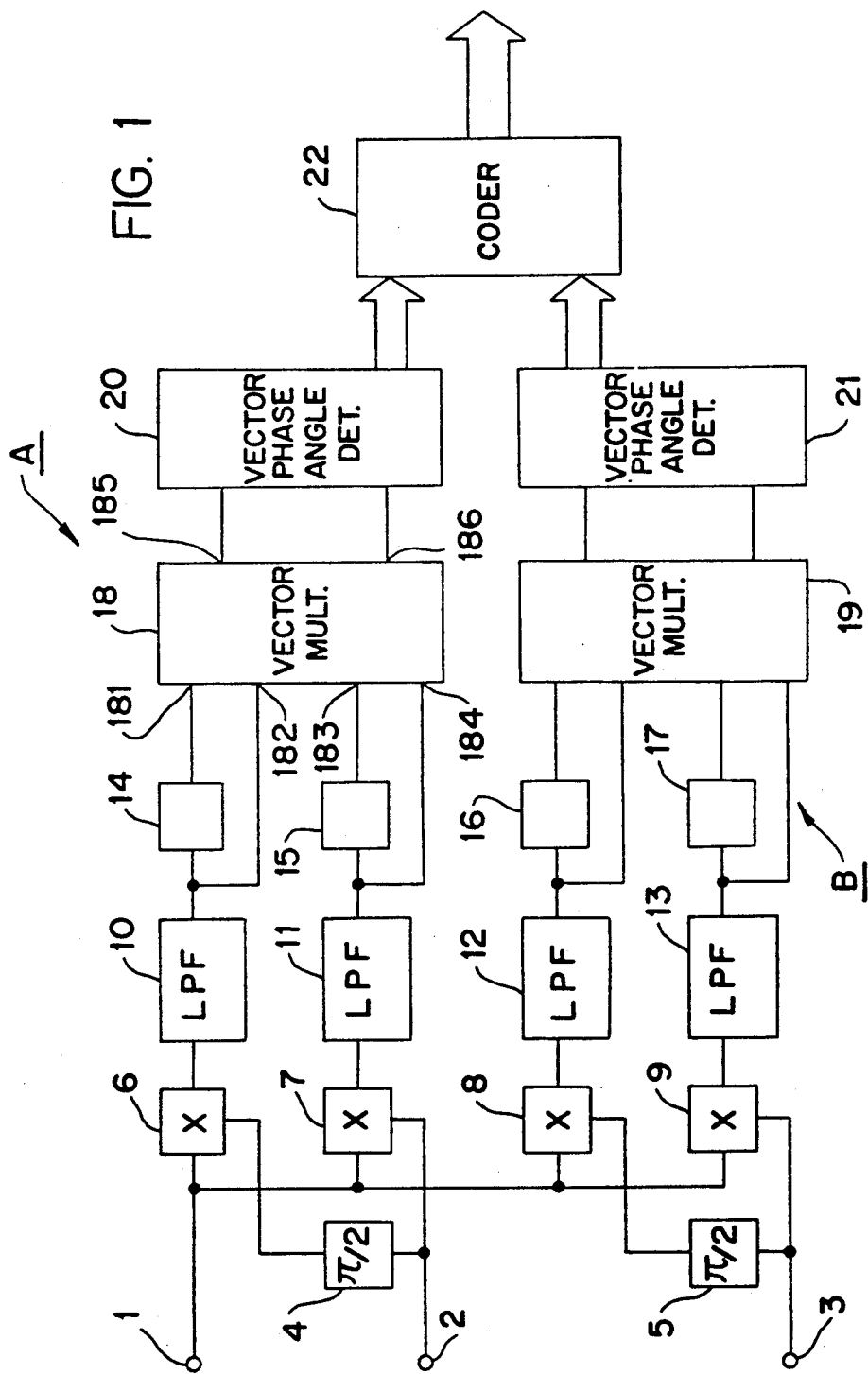
FIG. 1 is a block diagram for schematically illustrating a DTMF receiver according to the invention.

FIG. 1 illustrates a DTMF receiver according to the invention. The DTMF receiver of FIG. 1 comprises three input terminals 1 to 3, a frequency shift delay detection unit A for a lower frequency, a frequency shift delay detection unit B for a higher frequency, and a coder 22. In the preferred embodiment, a DTMF signal is input to the input terminal 1. A lower frequency group demodulation carrier and a higher frequency group demodulation carrier are input to the input terminals 2 and 3, respectively.

The frequency shift delay detection unit A for a lower frequency comprises a $\pi/2$ phase shifter 4, multipliers 6 and 7, low-pass filters 10 and 11, delay circuits 14 and 15, a vector multiplier 18, and a vector phase shifter 20. The input terminal 1 is connected to one input terminal of each of the multipliers 6 and 7. The other input terminal of the multiplier 6 is connected via the $\pi/2$ phase shifter 4 to the input terminal 2. The other input terminal of the multiplier 7 is directly connected to the input terminal 2. That is, the multiplier 6 multiplies the DTMF signal by a signal which has been phase-shifted by $\pi/2$ from the low frequency group demodulation carrier, while the multiplier 7 multiplies the DTMF signal by the low frequency group demodulation carrier. The $\pi/2$ phase shifter 4 may be inserted between the input terminal 1 and the multiplier 6 to phase-shift the DTMF signal, instead of between the input terminal 2 and the multiplier 6. In this case, however, the $\pi/2$ phase shifter will become complex in construction since it is required to handle the variation in the frequency of the DTMF signal.

The outputs of the multipliers 6 and 7 are connected to the low-pass filters 10 and 11, respectively. The low-pass filters 10 and 11 which receive respectively the output signals from the multipliers 6 and 7 pass a signal having a frequency which is equal to the result obtained by subtracting the frequency of the lower frequency group demodulation reference carrier from the frequency of a lower frequency tone contained in the DTMF signal. As described above, the multiplier 6 multiplies the DTMF signal by a signal which has been $\pi/2$-phase-shifted from the low frequency group demodulation carrier. Therefore, there is a $\pi/2$ phase shift between the output signals of the low-pass filters 10 and 11.

The output signal of the low-pass filter 10 is input via the delay circuit 14 to an input terminal 181 of the vector multiplier 18, and also directly to another input terminal 182 of the vector multiplier 18. The output signal from the low-pass filter 11 is input via the delay circuit 15 to a further input terminal 183 of the vector multiplier 18, and also directly to a further input terminal 184 of the vector multiplier 18. Two output terminals 185 and 186 of the vector multiplier 18 are connected to a vector phase shifter 20. The output of the phase shifter 20 is connected to the coder 22.

The frequency shift delay detection unit B for a higher frequency comprises a $\pi/2$ phase shifter 5, multipliers 8 and 9, low-pass filters 12 and 13, delay circuits 16 and 17, a vector multiplier 19, and a vector phase shifter 21. The unit B is similar in configuration to the above-described unit A, except that the $\pi/2$ phase shifter 5 and the multiplier 9 are connected to the input terminal 3 for the higher frequency group, not to the input terminal 2 for the low frequency group.

Figure 2:
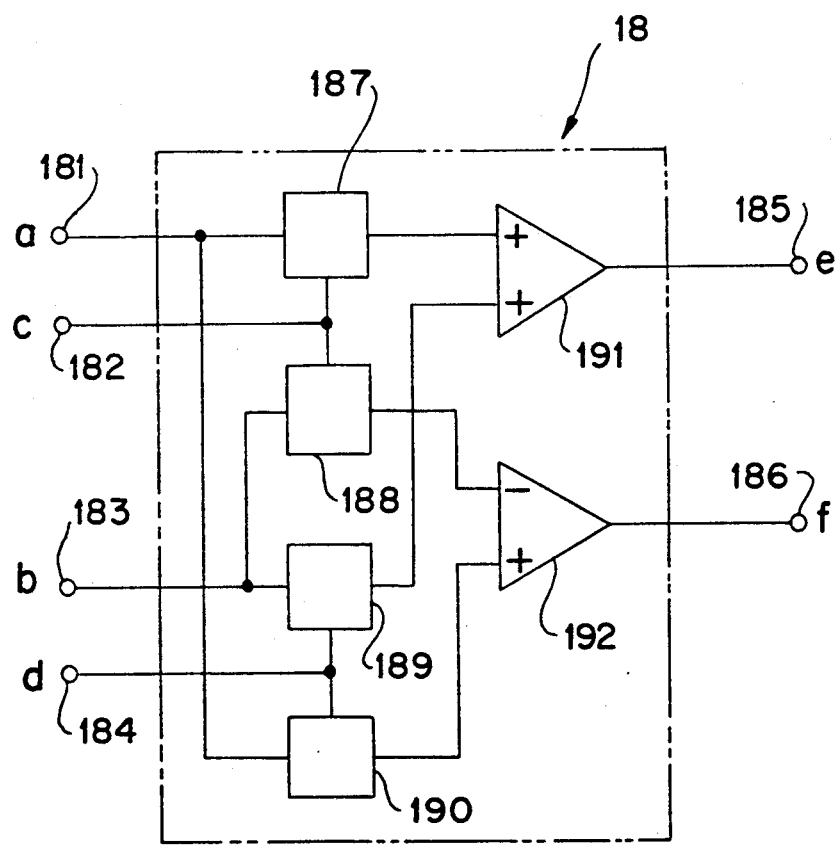
FIG. 2 is a block diagram of a vector multiplier used in the DTMF receiver of FIG. 1.

FIG. 2 illustrates the vector multiplier 18. The vector multiplier 18 comprises four multipliers 187, 188, 189 and 190, and two adders 191 and 192. The input terminals 181 and 183 constitute a first input port, and the input terminals 182 and 184 a second input port. The vector multiplier 18 treats the signals input from each input port as the real part and imaginary part of a complex vector or a vector represented in the form of a complex number. The input signals at the input terminals 181 and 183 of the first input port respectively represent the real part and imaginary part of a complex vector, and the input signals at the input terminals 182 and 184 of the second input port respectively represent the real part and imaginary part of another complex vector. The vector multiplier 18 multiplies the complex vector by the other complex vector, and outputs the real and imaginary parts of the resulting complex vector at the output terminals 185 and 186, respectively. In other words, when the signals input at the input terminals 181, 183, 182 and 184 are respectively denoted by a, b, c and d, and the signals output at the output terminals 185 and 186 by e and f, the calculation as shown by the following expression is performed.

$$\begin{aligned}conj(a + jb) \times (c + jd) &= (a - jb) \times (c + jd) \\ &= (ac + bd) + j(ad - bc) \\ &= e + jf\end{aligned}$$

where "conjA" denotes the conjugate complex vector of a complex vector A. The vector multiplier 19 has the same configuration as the vector multiplier 18.

The operation of the DTMF receiver of FIG. 1 will be described. The frequency of the lower frequency group demodulation reference carrier is denoted by $f_L$, and that of the higher frequency group demodulation reference carrier by $f_H$. Also, it is assumed that a DTMF signal composed of two kinds of tone with frequencies $f_A$ and $f_E$ is input to the input terminal 1. With the output signal from the low-pass filters 10 as the real part and the output signal from the low-pass filter 11 as the imaginary part, the output signals from the low-pass filters 10 and 11 are expressed in the form of a complex vector as follows:

$$X_L(t) = \exp j\{2\pi(f_A - f_L)t + \phi_0\} \quad (1)$$

Likewise, the output signals from the low-pass filters 12 and 13 are expressed as:

$$X_H(t) = \exp j\{2\pi(f_E - f_H)t + \phi_1\} \quad (2)$$

In the expressions (1) and (2) $\phi_0$ and $\phi_1$ are phase constants.

When the delay times in the delay circuits 14 and 15 are both denoted by $\tau_0$, the output signals from the delay circuits 14 and 15 are expressed in the form of a complex vector as follows:

$$X_L(t-\tau) = \exp j\{2\pi(f_A - f_L)(t - \tau_0) + \phi_0\} \quad (3)$$

When the delay times in the delay circuits 16 and 17 are both denoted by $\tau_1$, the output signals from the delay circuits 16 and 17 are expressed in the form of a complex vector as follows:

$$X_H(t-\tau) = \exp j\{2\pi(f_E - f_H)(t - \tau_1) + \phi_1\} \quad (4)$$

Therefore, the output signal from the vector multiplier 18 can be expressed as follows:

$$\text{conj}\{X_L(t - \tau)\} \cdot X_L(t) = \exp -j\{2\pi(f_A - f_L)(t - \tau_0) + \phi_0\} \times \exp j\{2\pi(f_A - f_L)t + \phi_0\} \quad (5)$$
$$= \exp j2\pi(f_A - f_L)\tau_0$$

Similarly, the output signal from the vector multiplier 19 can be given as follows:

$$\text{conj}\{X_H(t - \tau)\} \cdot X_H(t) = \exp -j\{2\pi(f_E - f_H)(t - \tau_1) + \phi_1\} \times \exp j\{2\pi(f_E - f_H)t + \phi_1\} \quad (6)$$
$$= \exp j2\pi(f_E - f_H)\tau_1$$

As seen from equations (5) and (6), when the delay times $\tau_0$ and $\tau_1$ are adequately set, the phase angle of the complex vector which is output from the vector multiplier 18 or 19 is proportional to the difference between the corresponding tone frequency and the reference carrier frequency. The vector phase angle detectors 20 and 21 detect those phase angles. Based on the phase angles which are supplied from the vector phase angle detectors 20 and 21, the coder 22 outputs a code indicating the dial number which corresponds to the entered DTMF signal.

In the vector multipliers 18 and 19, if the conjugate complex vectors of $X_L(t)$ and $X_H(t)$ are taken instead of the conjugate complex vectors of $X_L(t-\tau)$ and $X_H(t-\tau)$, substantially the same results can be obtained.

Figure 3:
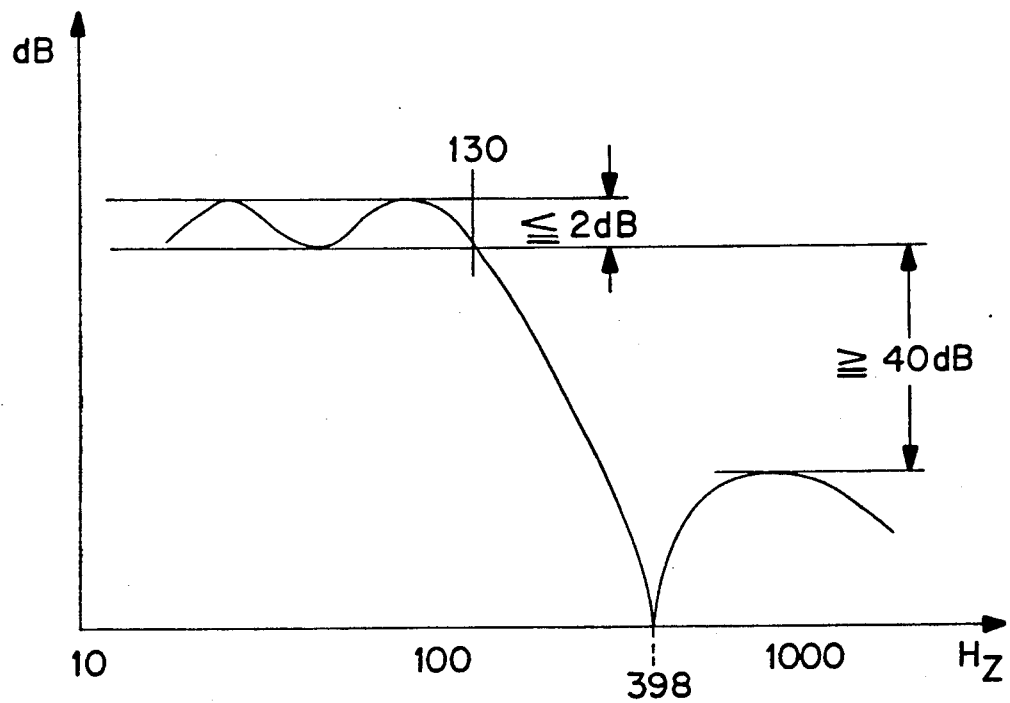
FIG. 3 is a graph for showing a preferred frequency-amplitude characteristic of a low-pass filter for a lower frequency used in the DTMF receiver of FIG. 1.
Figure 4:
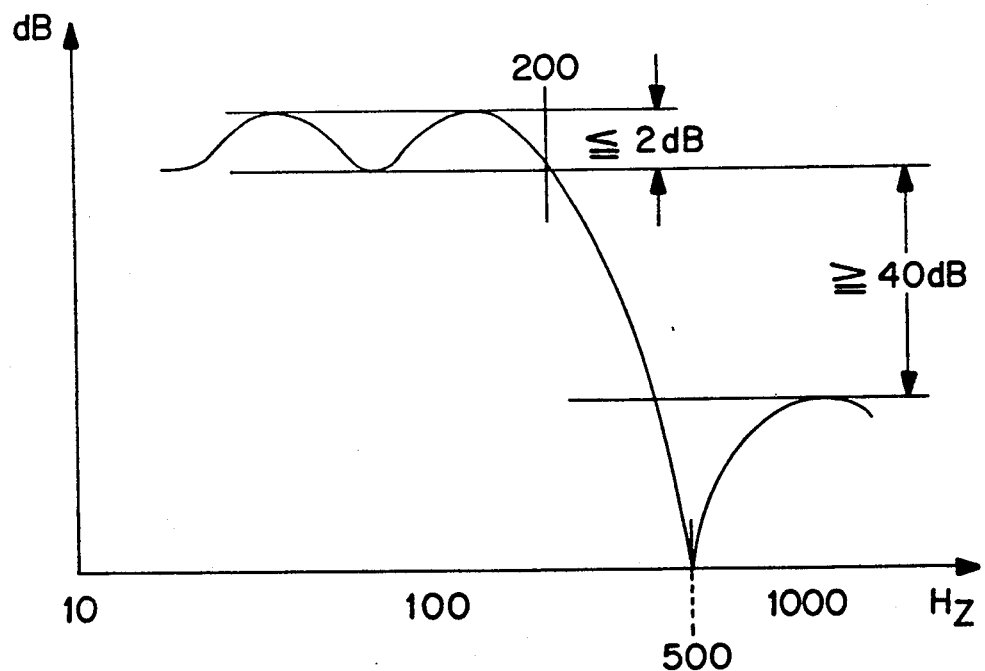
FIG. 4 is a graph for showing a preferred frequency-amplitude characteristic of a low-pass filter for a higher frequency used in the DTMF receiver of FIG. 1.
Figure 5:
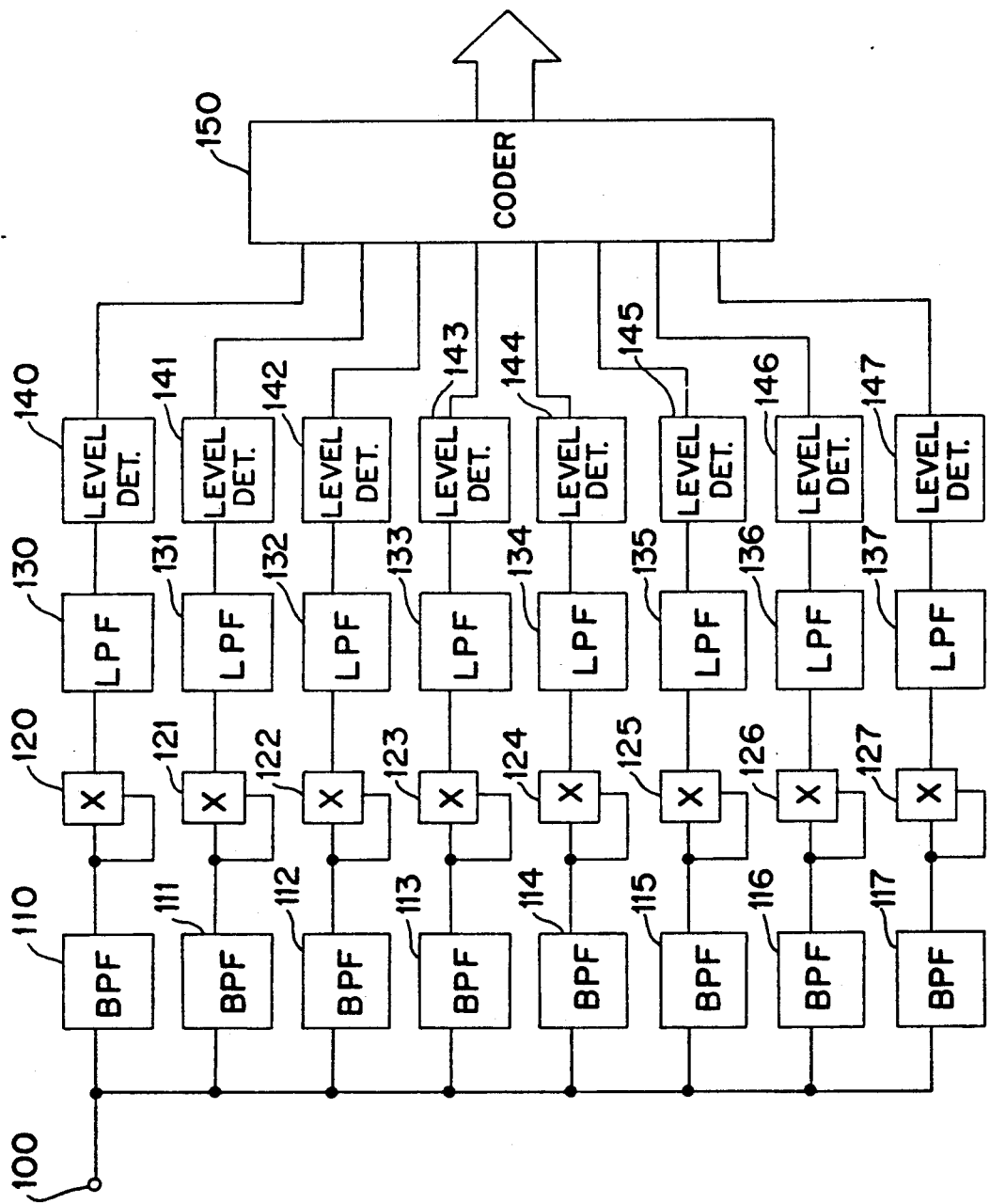
FIG. 5 is a block diagram for schematically illustrating a conventional DTMF receiver.

When the receiver of FIG. 1 is constructed using a DSP (Digital Signal Processor), parameters may be set as described below. The lower frequency group demodulation reference frequency $f_L$ is set at 811 Hz ($=(f_B+f_C)/2$), and the higher frequency group demodulation reference frequency $f_H$ at 1406.5 Hz ($=(f_F+f_G)/2$). A preferred frequency band characteristic for the low-pass filters 10 and 11 of the unit A is shown in FIG. 3, and that for the low-pass filters 12 and 13 of the unit B in FIG. 4.

The delay units 14, 15, 16 and 17 may comprise shift registers which operate on a sampling frequency of 7200 Hz. In the embodiment, the delay times $\tau_0$ and $\tau_1$ are set at 14 sampling cycles ($=14/7200$s) and 9 sampling cycles ($=9/7200$s), respectively. The output phase angles of the vector phase angle detector 20 which correspond to the frequencies of the lower frequency group tones are approximately as follows:

$f_A: -\pi/2$
$f_B: -\pi/6$
$f_C: +\pi/6$
$f_D: +\pi/2$

On the other hand, the output phase angles of the vector phase angle converter 21 which correspond to the frequencies of the higher frequency group tones are approximately as follows:

$f_E: -\pi/2$
$f_F: -\pi/6$
$f_G: +\pi/6$
$f_H: +\pi/2$

Therefore, the coder 22 can recognize the type of the tone frequencies contained in the DTMF signal input to the terminal 1, by setting a judging area having a given width around each of the above phase angles.

As apparent from the above, the DTMF receiver according to the invention requires a substantially reduced number of components as compared with a conventional DTMF receiver. In particular, since the DTMF receiver according to the invention does not require the provision of band-pass filters having sharp frequency band characteristics, the system can be easily constructed using a DSP, etc.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A dual tone multiple frequency (DTMF) receiver comprising:
   a frequency shift delay detection unit for a lower group of frequencies; and
   another frequency shift delay detection unit for a higher group of frequencies,
   each of said frequency shift delay detection units comprising:
   circuit means for receiving one of said lower group of frequencies or one of said higher group of frequencies, and for generating a first signal and second signal, said first signal having a frequency obtained by subtracting a reference carrier frequency from a frequency of the corresponding frequency group, and said second signal having a phase difference of $\pi/2$ with respect to said first signal;
   other circuit means for generating a third signal and fourth signal, said third signal and said fourth signal being different in phase from said first and second signals, respectively;
   vector calculation means connected to said circuit means and said other circuit means, in which said first and second signals are supplied to one input port for receiving one vector, and said third and fourth signals to the other input port for receiving another vector; and
   detection means for detecting a phase difference between the output of said vector calculation means.

2. A DTMF receiver according to claim 1 wherein said output of said vector calculation means are respectively the real part and imaginary part of a first complex number which is obtained by:
   designating the level of said first signal as the real part of a second complex number, and that of said second signal as the imaginary part of said second complex number;
   designating the level of said third signal as the real part of a third complex number, and that of said fourth signal as the imaginary part of said third complex number; and
   multiplying said second and third complex numbers.

3. A DTMF receiver according to claim 1 wherein said receiver further comprises a coder which is connected to the output of said detection means of each detection unit to generate a signal representing a digit.

4. A dual tone multiple frequency (DTMF) receiver comprising:
- a frequency shift delay detection unit for a lower group of frequencies; and
- another frequency shift delay detection unit for a higher group of frequencies,
- each of said frequency shift delay detection units comprising:
- circuit means for receiving one of said lower group of frequencies or one of said higher group of frequencies, and for generating a first signal and a second signal, said circuit means comprising low-pass filters, said first signal having a frequency obtained by subtracting a reference carrier frequency from a frequency of the corresponding frequency group, and said second signal having a phase difference of $\pi/2$ with respect to said first signal;
- delay means for generating a third signal and fourth signal, said third signal and said fourth signal being delayed in phase from said first and second signals, respectively;
- vector calculation means connected to said circuit means and said delay means, in which said first and second signals are supplied to one input port for receiving one vector, and said third and fourth signals to the other input port for receiving another vector, the real and imaginary parts of the complex number representing the resulting vector being output separately; and
- detecting means for receiving said real and imaginary parts, and for detecting the phase angle of said complex number.

* * * * *

UNITED STATES PATENT AND TRADEMARK OFFICE
CERTIFICATE OF CORRECTION

PATENT NO. : 5,117,369
DATED : May 26, 1992
INVENTOR(S) : Syuuichi Yoshikawa

It is certified that error appears in the above-identified patent and that said Letters Patent is hereby corrected as shown below:

On the title page: Add Assignee --SHARP KABUSHIKI KAISHA, Osaka, Japan--

Signed and Sealed this

Tenth Day of August, 1993

Attest:

MICHAEL K. KIRK

*Attesting Officer*       *Acting Commissioner of Patents and Trademarks*

UNITED STATES PATENT AND TRADEMARK OFFICE
CERTIFICATE OF CORRECTION

PATENT NO. : 5,117,369
DATED : May 26, 1992
INVENTOR(S) : Syuuichi Yoshikawa It is certified that error appears in the above-identified patent and that said Letters Patent is hereby corrected as shown below:

Col. 6, Claim 1, line 51 change "output" to --outputs--

Col. 6, Claim 2, line 2 change "output" to --outputs--

Signed and Sealed this

Twenty-first Day of September, 1993

*Attest:*

BRUCE LEHMAN

*Attesting Officer*  *Commissioner of Patents and Trademarks*